Patented Feb. 9, 1954

2,668,804

UNITED STATES PATENT OFFICE

2,668,804

PIGMENTS AND MOLDING POWDERS COMPRISING POLYVINYL ACETAL RESINS DYED WITH AZO DYES

Louis Amédée Lantz, Arthur Schofield, and Ernst Spinner, Manchester, England, assignors to The Calico Printers' Association Limited, Manchester, England, a British company No Drawing. Application September 20, 1948, Serial No. 50,252

Claims priority, application Great Britain October 8, 1947

16 Claims. (Cl. 260—41)

In the prior application, Serial No. 592,918, filed on May 9, 1945, by two of us (Lantz and Schofield) and now abandoned, there is described the preparation of finely divided polyvinyl acetals containing acetal groups derived from at least one aldehyde of the benzene and napthalene series which is free from water-solubilizing groups, hereinafter referred to briefly as "polyvinyl benzals," and the production of pigments and of moulding powders or constituents of moulding powders by dyeing such polyvinyl benzals with basic dyestuffs, or with dyestuffs of other classes containing one or more basic groups, or one or more hydroxy groups, and characterised by sparing solubility in water.

The object of the present invention is to provide a method whereby pigments and moulding powders of outstanding merit may be obtained with dyestuffs belonging to the class known as insoluble azo dyestuffs.

Insoluble azo dyestuffs are formed by reacting a diazotised amine with a coupling component, neither of the reactants having any water-solubilising substituent.

The coupling components suitable for the production of insoluble azo dyestuffs comprise substances possessing a hydroxyl group attached to an unsaturated carbon-carbon linkage, i. e. the grouping

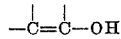

The double bond of this grouping may be part of an aromatic nucleus such as in phenols and naphthols, or it may be part of a heterocyclic ring, or of an aliphatic chain, as in enolic compounds derived from aceto-acetic acid.

We have found by research and experiment that the alkali salts of coupling components possessing the grouping

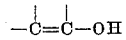

have a considerable affinity for polyvinyl benzals, and are taken up in substantial amounts from their aqueous solutions. If a polyvinyl benzal which has been treated in such manner with an alkali salt of the coupling component is subsequently treated with an aqueous solution of a suitable aromatic diazonium salt, the insoluble azo dyestuff is formed on the polyvinyl benzal, yielding a pigment which is generally brighter in colour than the insoluble azo dyestuff itself, its brightness equalling that of the insoluble azo dyestuff when formed on a textile fabric. In order to effect an exact comparison, it may be necessary to dilute the insoluble dyestuff to some extent by intimately mixing it with a certain proportion of a white pigment. The polyvinyl benzal-insoluble azo pigments so obtained are at least as fast to light as the original insoluble azo dyestuffs, and they are also fast to washing.

Our invention therefore provides a process for producing insoluble azo pigments of a new and improved type.

Our invention comprises treating a finely divided polyvinyl benzal with an aqueous solution of an alkali salt of a coupling component as defined above, until the required amount of coupling component has been taken up, washing the polyvinyl benzal to remove unfixed coupling component, treating the washed polyvinyl benzal in an aqueous solution of a diazonium salt derived from an aromatic amine having no water-solubilising substituent, until coupling is completed, washing the dyed polyvinyl benzal free from excess diazonium salt, completing the washing by a hot treatment in soap solution if desired, washing again and drying the product.

The polyvinyl benzals and partial polyvinyl benzals used in the present invention are prepared by adding an aromatic aldehyde of the benzene and naphthalene series to an aqueous solution of a polyvinyl alcohol, the concentration of the polyvinyl alcohol not exceeding 10% by weight of the reaction mixture, and reacting the same at a temperature not exceeding 80° C. in the presence of a low concentration of an acid catalyst, e. g. up to 0.2% by weight of sulphuric acid or the equivalent thereof, the aldehyde being finely dispersed in the reaction medium before the reaction begins and being present in the proportion of at least 0.1 mol. of aldehyde to 1.0 mol. of alcohol. Preferably the molecular ratio of aldehyde to alcohol is between 0.1:1.0 and 0.8:1.0. The product is insoluble in water, and is very finely divided, a product having an average particle size not exceeding 3.5 microns and a maximum particle size not exceeding about 10 microns being readily obtainable.

The polyvinyl alcohols used in this process include partial polyvinyl alcohols which, while soluble in water, contain, in addition to hydroxyl groups, either ester groups, or aliphatic acetal groups or both. Consequently the polyvinyl benzals include also polyvinyl benzals, in which there are ester groups or aliphatic acetal groups or both. Benzals in which only part of the available or potentially available hydroxyl groups have been reacted with an aromatic aldehyde are also included, provided they are insoluble in water.

These are referred to as "partial polyvinyl benzals."

It has been found that with increasing replacement of the hydroxyl groups by acetal groups, the affinity for coupling components possessing the grouping

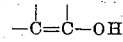

gradually decreases. It is therefore preferable to use such partial polyvinyl benzals in which not less than 40% of the original (theoretical) alcoholic hydroxyl groups of the polyvinyl alcohol are still present (unreplaced by acetal groups) for the production of pigments, especially when deep shades are required, so as to effect the best possible exhaustion of the dyebath and economise in the cost of dyeing.

The aromatic aldehydes which may be used include benzaldehyde, substitution products thereof such as chloro-benzaldehydes and nitro-benzaldehydes, homologues thereof such as tolualdehydes, and naphthaldehydes.

Any coupling component possessing the grouping

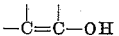

and devoid of water-solubilising substituents may be used for dyeing the finely divided polyvinyl benzal. We prefer however to use 2-napthol and the coupling components commercially grouped under the designation of Naphthols AS, which comprise arylamides of aromatic hydroxy-carboxylic acids, such as 2-hydroxy-3-naphthoic acid, and of keto-enolic compounds having one or more groupings $R-CO-CH_2-CO-$. Examples of coupling components included in the Naphthol AS group are 2-hydroxy-3-naphthoic acid anilide (Naphthol AS), 2-hydroxy-3-naphthoic acid o-toluidide (Naphthol AS-D), 2-hydroxy-3-naphthoic acid p-anisidide (Naphthol AS-RL), 2-hydroxy-carbazole-3-carboxylic acid-p-chloranilide (Naphthol AS-LB), di-acetoacetic acid-o-tolidide (Naphthol AS-G), and 2-aceto-acetylamino - 6 - ethoxy - benzothiazol (Naphthol AS-L4G). Examples of phenolic compounds which yield valuable pigments are the dihydroxy-diphenylmethanes, such as 2.2'-dihydroxy-5.5'-dimethyl-diphenylmethane.

Likewise, we may use in the second part of the process any aromatic amine devoid of water-solubilising substituents and capable of forming sufficiently stable and sufficiently water-soluble diazonium salts. Examples of suitable aromatic bases are aniline, toluidine, benzidine, amino-azo-benzene, amino-diphenylamine, naphthylamine, amino-anthraquinone, and substitution products of same, such as their halogen-, cyano-, nitro-, alkoxy-, phenoxy-, halogenomethyl-, and benzoylamine-derivatives.

In carrying out our invention, we prepare an aqueous solution of an alkali salt of the coupling component, for instance a naphthol, preferably using an excess of the alkali over the quantity necessary to form the alkali salt of the coupling component. For instance, we may use from 2 to 6 times that amount or even more, since we find that with increasing concentration of alkali the amount of coupling component taken up by the pores of the polyvinyl benzal also increases.

We have also found it advantageous to add to the solution of the alkali salt of the coupling component a dispersing agent such as ricinoleate or sulphuricinoleate of an alkali metal. We may also add an electrolyte, such as sodium chloride or sulphate, in order to increase the amount of alkali salt of the coupling component taken up by the polyvinyl benzal.

We may treat the polyvinyl benzal in this solution at ordinary temperature, but better results are obtained at elevated temperatures, such as 50–100° C. The treatment may be continued until equilibrium is reached between the alkali salt of the coupling component on the polyvinyl benzal, and that in the residual liquor.

The treated polyvinyl benzal is then filtered off, washed with water to remove unfixed coupling component, and further treated in a solution of a diazotised aromatic base of the type indicated above, until reaction with the alkali salt of the coupling component is complete. The solution of the diazonium salt is prepared by usual methods, and is preferably used in such amount and concentration as to be in excess of the amount of alkali salt of the coupling component present on the polyvinyl benzal.

The dyed polyvinyl benzal particles are then washed with water to remove the excess of diazonium salt and the acid, and are preferably further washed in hot soap and sodium carbonate solution, washed again, and dried. This leaves the dyestuff in the pores of the particles of polyvinyl benzal while leaving their surfaces substantially free from unfixed dyestuff.

Instead of treating the polyvinyl benzal with an alkali salt of the coupling component and with a diazonium salt in two successive operations, we may in some cases convert the diazonium salt of the amine into the corresponding isodiazotate in known manner, and apply this to the polyvinyl benzal together with the alkali salt of the coupling component. Both components are taken up simultaneously by the polyvinyl benzal, and the insoluble azo dyestuff is obtained by subsequent acidification.

Example 1

28.8 grams of 2-naphthol are dissolved in a mixture of 63 ml. of a 33% solution of sodium hydroxide, 15 ml. of a 25% solution of a sodium ricinoleate and 320 ml. of water, and the whole then made up to 500 ml. 25 grams of a partial polyvinyl benzal in finely divided form are pasted with 80 ml. of the above solution, and the remainder of the solution is stirred in gradually. The mixture is then heated to 60° C. and kept at this temperature for 30 mins. with stirring, after which the polyvinyl benzal is filtered, washed with water, and pressed.

9 grams of 4-nitro-2-methoxy-aniline are diazotised in the usual manner with sodium nitrite and hydrochloric acid, and after adding sufficient sodium acetate to neutralise the excess of hydrochloric acid, the solution is made up to 300 ml. with cold water. The polyvinyl benzal, which has been treated as described in the first part of this example, is now pasted with 80 ml. of the diazonium solution, the remainder of the solution is added gradually, and the mixture stirred for about 2 hours. The dyed polyvinyl benzal is then filtered, washed free from diazonium solution with cold water, treated with a solution of 2 grams of soap and 0.5 gram of sodium carbonate per litre for 10 mins. at 95° C., again filtered, washed free of alkali and dried. The product is a bluish red pigment of good fastness to light.

Example 2

26.3 grams of 2-hydroxy-3-naphthoic acid anilide are pasted with 15 ml. of a 25% solution of sodium sulphoricinoleate; 45 ml. of a 33% solution of sodium hydroxide, and about 400 ml. of hot water are added, and after the naphthol has dissolved, the solution is made up with water to 500 ml. 25 grams of a finely divided partial polyvinyl benzal are pasted with 80 ml. of the above solution and the remainder is added gradually. The mixture is then heated to 90° C., and kept at this temperature for 30 mins. with stirring, after which the temperature is allowed to drop to 50° C., when the polyvinyl benzal is filtered, washed with water and hydro-extracted. It is then treated in a diazonium solution obtained in the usual manner from 8 grams of 4-chloro-2-methyl-aniline, and made up to 300 ml. The procedure is the same as described in Example 1. The product is a bright red pigment of excellent fastness to light.

If instead of diazotised 4-chloro-2-methyl-aniline, 50 grams of a stable composition containing 20% of the diazonium salt of 2-chloro-5-trifluoromethylaniline in 300 ml. of 4% aqueous acetic acid is used, a bright orange pigment of excellent fastness to light is obtained.

Example 3

25 grams of finely divided partial polyvinyl benzal are treated first with 2-hydroxy-3-naphthoic acid anilide as described in Example 2, and then with a diazonium solution prepared in the usual way from 8 grams of 4-nitro-2-methyl aniline, and bulked to 300 ml. The procedure is the same as in Example 1. The product is a dark red pigment of excellent fastness to light. The azo compound, 1-(2'-methyl-4' nitrobenzene-1'-azo)-2-hydroxy-3-naphthoic acid anilide, which is obtained from the above components by direct reaction in aqueous solution, is a dark bronzy powder. If this powder is intimately mixed with a proportion of a white pigment, such as Lithopone, so as to make it comparable in depth of shade with the dyed polyvinyl benzal, the latter appears very much the brighter.

Example 4

A claret pigment of excellent fastness to light is obtained by treating a partial polyvinyl benzal by the procedure described in Examples 1 and 2, first with a solution of the sodium salt of 2-hydroxy-3-naphthoic acid p-anisidide, and then with a solution of diazotised 4-nitro-2-methoxy-aniline.

The resulting pigment is much brighter than the azo compound obtained directly in aqueous solution from these components.

Example 5

A bright blue pigment of very good fastness to light is obtained by treating a partial polyvinyl benzal by the procedure described in Examples 1 and 2, first with a solution of the sodium salt of 2-hydroxy-3-naphthoic acid o-toluidide, and then with a solution of diazotised 2.5-diethoxy-4-benzoylamino-aniline.

The resulting pigment is very much brighter than the azo compound obtained directly in aqueous solution from these components, and this advantage is rendered particularly evident when the latter is mixed with some white pigment so as to make it more comparable in depth of shade with the dyed polyvinyl benzal.

If diazotised 2-methoxy-5-methyl-4-benzoylamino-aniline is used instead of 2.5-diethoxy-4-benzoylamino-aniline, a bright violet pigment is obtained which shows the same advantage of much superior brightness against the azo compound obtained directly in aqueous solution from these components.

Example 6

A purplish blue pigment is obtained by the procedure described in Examples 1 and 2, by treating a finely divided partial polyvinyl benzal first with a solution of the sodium salt of 2-hydroxy-3-naphthoic acid anilide and then with a diazonium solution prepared in known manner from 3.3'-dimethyl-4.4'-diamino-diphenyl.

If instead of the above diazonium solution, a solution of a stabilised diazonium salt of 4-(4'-nitrobenzene-azo)-2.5-dimethoxy-aniline is used, a black pigment of good fastness to light is obtained.

Example 7

28.5 grams of diacetoacetic acid-o-tolidide are pasted with 15 ml. of a 25% solution of sodium sulphoricinoleate and 63 ml. of a 33% solution of sodium hydroxide, about 400 ml. of hot water are added, and the resulting solution is made up to 500 ml. 25 grams of a finely divided partial polyvinyl benzal are pasted with 80 ml. of the above solution, the remainder being added gradually, and then treated for 30 mins. at 90° C. under stirring. The liquor is allowed to cool to 70° C. The treated powder is then filtered, washed with cold water, and pressed. It is then further treated with a diazonium solution prepared in known manner from 2-methoxy-aniline. The product is a lemon yellow pigment of very good fastness to light.

Example 8

35 grams of an equimolecular mixture of 2-hydroxy-3-naphthoic acid anilide and the sodium derivative of 2.5-dichlorobenzene diazonium hydroxide, are pasted with 20 ml. of a 25% solution of sodium sulphoricinoleate and 63 ml. of a 33% solution of sodium hydroxide, about 400 ml. of hot water are added, and after the product has dissolved, the solution is made up to 500 ml. 25 grams of finely divided partial polyvinyl benzal are pasted with 80 ml. of the solution, and the remainder is stirred in gradually. The mixture is then treated for 30 mins. at 60° C. under stirring. The treated polyvinyl benzal is then filtered, washed with cold water, pressed, and then treated with an excess of hot 10% formic acid under stirring. After 10 mins., the dyed polyvinyl benzal is filtered, washed well with water, treated with hot alkaline soap solution as in the previous examples, filtered, pressed and dried. The product is a bright scarlet pigment of very good fastness to light.

Example 9

28.5 gms. of 2.2'-dihydroxy-5.5'-dimethyl-diphenylmethane are pasted with 56 mls. of a 33% solution of sodium hydroxide, about 350 mls. of hot water are added and the resulting solution made up to 500 mls. 25 gms. of a finely divided partial polyvinyl benzal, in which the percentage of hydroxyl groups replaced by benzal groups does not exceed 45%, are pasted with 80 mls. of the above solution, the remainder being then added gradually, and then treated for 30 minutes at 90° C. with stirring. The liquor is then allowed to cool with continued stirring to 50° C., the dyed powder is filtered off, washed with cold water and drained. It is then treated with a solution of diazotised 2.5-dichloraniline prepared in the usual manner. The subsequent procedure is the same as in Example 1. The product is an orange pigment of very good fastness to light.

Example 10

33.6 gms. of 2-hydroxycarbazole-3-carboxylic acid-p-chloranilide are pasted with 37.5 mls. of a 10% solution of sodium sulphoricinoleate and 50 mls. of a 33% solution of sodium hydroxide, 400 mls. of hot water are added, and when the product has dissolved the solution is made up to 500 mls. 25 gms. of a finely divided partial polyvinyl benzal are pasted with 80 mls. of the above solution, the remainder being then added gradually, and dyed at 90° C. for 30 minutes. The temperature is then allowed to drop to 70° C. and the dyed powder filtered off, washed with cold water, and drained. It is then treated with a solution of diazotised 4-nitro-2-methoxy-aniline. The subsequent procedure is the same as in Example 1. The product is a reddish brown pigment.

Example 11

25 gms. of a finely divided partial polyvinyl benzal are dyed with 500 mls. of a solution containing 0.57 gm. of 2-hydroxy-3-naphthoic acid-p-anisidide, 15 gms. of sodium hydroxide and 3.75 gms. of sodium sulphoricinoleate as described in previous examples. The dyed powder is then treated with a solution of diazotised 5-nitro-2-amino-toluene and the subsequent procedure is the same as in Example 1. The resulting pale pink powder is moulded in a press at 140° C. and a pressure of 2 tons per square inch. The resulting moulding is deep red.

What we claim is:

1. A method for the preparation of pigments and moulding powders, comprising dyeing a finely-divided water-insoluble aromatic polyvinyl acetal containing acetal groups derived from at least one aldehyde of the benzene and naphthalene series free from water-solubilizing groups, by mixing it with an aqueous solution of an alkali metal salt of a coupling component possessing the grouping

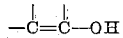

and devoid of water-solubilising substituents, until the coupling component has been substantially taken up by the acetal, washing the so-treated polyvinyl acetal to remove unfixed coupling component, mixing it with an aqueous solution of a diazonium salt derived from an aromatic amine having no water-solubilising substituent, until coupling is completed, washing the dyed polyvinyl acetal free from excess diazonium salt, and drying the product, whereby the dyed particles have a brightness which exceeds that of the insoluble dyestuff itself due to the presence of the dyestuff in the pores of the particles and the absence of unfixed dyestuff on the exterior surfaces of the particles.

2. A method as claimed in claim 1, in which the product, before drying, is treated in hot soap solution and again washed.

3. A method as claimed in claim 1, in which an excess of alkali is used in forming the solution of the alkali metal salt of the coupling component.

4. A method as claimed in claim 1, in which a dispersing agent, selected from the group consisting of the ricinoleates and sulphoricinoleates of alkali metals, is added to the solution of the alkali salt of the coupling component.

5. A method as claimed in claim 1, in which an electrolyte, selected from the group consisting of sodium chloride and sulphate, is added to the solution of the alkali salt of the coupling component.

6. A method as claimed in claim 1, in which the treatment in the solution of the alkali metal salt of the coupling component is effected at a temperature of 50–100° C.

7. A method as claimed in claim 1, in which the treatment in the solution of the alkali metal salt of the coupling component is continued until equilibrium is reached between the alkali metal salt of the coupling component on the acetal and that in the residual liquor.

8. A method as claimed in claim 1, in which the diazonium salt is used in excess as compared with the amount of alkali metal salt of the coupling component on the acetal.

9. A method as claimed in claim 1, in which the diazonium salt is converted into an isodiazotate and is applied to the polyvinyl acetal together with the alkali metal salt of the coupling component.

10. A method as claimed in claim 1, in which the polyvinyl acetal has an average particle size not exceeding 3.5 microns.

11. A method as claimed in claim 1, in which the acetal is treated with 2-naphthol.

12. A method as claimed in claim 1, in which the acetal is treated with an arylamide of 2-hydroxy-3-naphthoic acid.

13. In the preparation of pigments and moulding powders, the process which comprises dyeing a finely-divided water-insoluble aromatic polyvinyl acetal having an average particle size not exceeding 3.5 microns, containing acetal groups which are the residues of at least one aldehyde of the benzene and naphthalene series and containing unsubstituted alcohol groups amounting to at least about 40 per cent of those which would be present theoretically in the corresponding polyvinyl alcohol and being free from water-solubilizing substituents, by mixing said polyvinyl acetal at a temperature of from about 50 to 100° C. with an aqueous solution of an alkali metal salt of a coupling component possessing the grouping

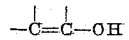

until the coupling component has been substantially taken up by the acetal, washing the so-treated acetal to remove unfixed coupling component, mixing it with an aqueous solution of a diazonium salt obtained by diazotizing an aromatic amine having no water-solubilizing substituents until coupling is completed, washing the dyed polyvinyl acetal free from excess diazonium salt, and drying the product, whereby the dyed particles have a brightness which exceeds that of the insoluble dyestuff itself due to the presence of the dyestuff in the pores of the particles and the absence of unfixed dyestuff on the exterior surfaces of the particles.

14. A finely-divided product, suitable for use as a pigment and a molding powder having an average particle size not exceeding 3.5 microns and consisting of a water-insoluble aromatic polyvinyl acetal whose acetal groups are the residues of at least one aldehyde selected from a class consisting of aldehydes of the benzene and naphthalene series and containing unsubstituted alcohol groups amounting to at least about 40 per cent of those which would be present theoretically in the corresponding polyvinyl alcohol, particles of said acetal being dyed and colored by the presence in the pores thereof of an insoluble azo dyestuff whose components are free from water solubilizing substituents, the exterior surfaces of said particles being substantially free from unfixed dyestuff, this causing said particles to be colored more brilliantly than the insoluble dyestuff itself.

15. A finely-divided product, suitable for use as a pigment and a molding powder having an average particle size not exceeding 3.5 microns and consisting of a water-insoluble aromatic polyvinyl benzal containing unsubstituted alcohol groups amounting to at least about 40 per cent of those which would be present theoretically in the corresponding polyvinyl alcohol, said particles being dyed and colored by the presence in the pores thereof of an insoluble azo dyestuff whose components are free from water solubilizing substituents, the exterior surfaces of said particles being substantially free from unfixed dyestuff, this causing said particles to be colored more brilliantly than the insoluble dyestuff itself.

16. In the preparation of pigments and molding powders, the process which comprises dyeing a finely-divided, water-insoluble aromatic polyvinyl benzal having an average particle size not exceeding 3.5 microns, containing unsubstituted alcohol groups amounting to at least about 40 per cent of those which would be present theoretically in the corresponding polyvinyl alcohol and being free from water-solubilizing groups, by mixing said polyvinyl benzal at a temperature of from about 50 to 100° C. with an aqueous solution of an alkali metal salt of a coupling component possessing the grouping $$-\overset{|}{C}=\overset{|}{C}-OH$$

until the coupling component has been substantially taken up by the benzal, washing the so-treated benzal to remove unfixed coupling component, mixing it with an aqueous solution of a diazonium salt obtained by diazotizing an aromatic amine having no water-solubilizing substituents until coupling is completed, washing the dyed polyvinyl benzal free from excess diazonium salt, and drying the product, whereby the dyed particles have a brightness which is greater than that of the insoluble dyestuff.

LOUIS AMÉDÉE LANTZ.
ARTHUR SCHOFIELD.
ERNST SPINNER.

References Cited in the file of this patent
UNITED STATES PATENTS

| Number | Name | Date |
| --- | --- | --- |
| 1,997,769 | Fletcher | Apr. 16, 1935 |
| 2,310,943 | Dorough et al. | Feb. 16, 1943 |
| 2,313,076 | Klinkenstein et al. | Mar. 9, 1943 |
| 2,332,895 | D'Alelio | Oct. 26, 1943 |
| 2,397,454 | Woodward | Mar. 26, 1946 |
| 2,534,136 | Lantz et al. | Dec. 12, 1950 |